Figures 1, 2:
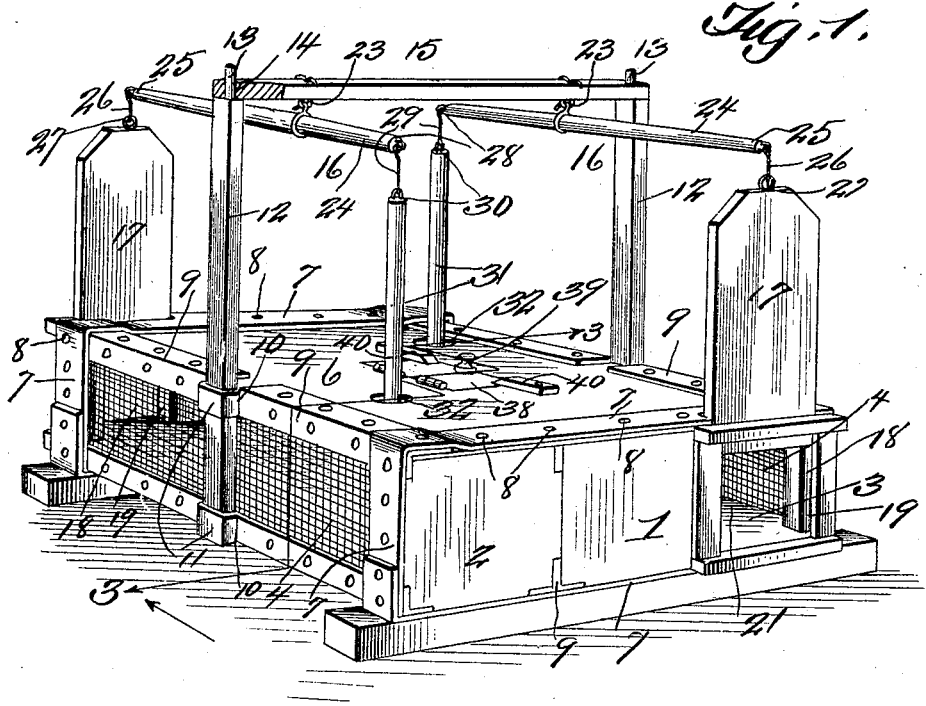

P. S. HICKS.
TRAP.
APPLICATION FILED SEPT. 14, 1908.

909,797.

Patented Jan. 12, 1909.

2 SHEETS—SHEET 1.

Witnesses

Inventor
P. S. Hicks.
By D. Swift & C.
Attorneys

P. S. HICKS.
TRAP.
APPLICATION FILED SEPT. 14, 1908.

909,797.

Patented Jan. 12, 1909.

2 SHEETS—SHEET 2.

Witnesses

Inventor
P. S. Hicks.
By D. Swift &c.
Attorneys

UNITED STATES PATENT OFFICE.

PHESENTON SUGGS HICKS, OF ROCKY MOUNT, NORTH CAROLINA, ASSIGNOR OF ONE-HALF TO WILLIAM T. ROSE, OF ROCKY MOUNT, NORTH CAROLINA.

TRAP.

No. 909,797.     Specification of Letters Patent.     Patented Jan. 12, 1909.

Application filed September 14, 1908. Serial No. 452,880.

*To all whom it may concern:*

Be it known that I, PHESENTON SUGGS HICKS, a citizen of the United States, residing at Rocky Mount, in the county of Nash and State of North Carolina, have invented a new and useful Trap; and I do hereby declare the following to be a full, clear, and exact description of the invention, such as will enable others skilled in the art to which it appertains to make and use the same.

The invention about to be set forth pertains to a new and useful animal trap; and the invention in its broadest scope has for its primary object to provide a neat appearing improved trap, composed of three boxes, two sides of two of the boxes having perforated metal or mesh sides, while the third box has two open faces, and when the two boxes having the perforated or mesh sides are placed adjacent to the open sides of the third box, a very efficient trap having three compartments is provided, as will be clearly observed in the drawings.

The invention aims as a further object to provide means for securely binding these boxes, forming three compartments, together by means of a sheet metal cover, which is held in place by a strip of sheet metal bound about the entire corners of the trap, as clearly shown in Figure 1 of the accompanying drawings. There is also a metal sheet binding for holding the perforated sheet metal or mesh sides in their proper position, as seen also in Fig. 1 of the drawings.

The two boxes having the perforated or mesh sides are provided with openings, which are positioned at opposite ends of the trap, when the two boxes are secured in position, as shown in Fig. 1 of the drawings. These openings are provided with suitable closures or trap doors, which are released by an animal, when contacting with the new and useful trigger device, which is disposed upon the interior of the two outside boxes.

The center box which is closed by the two outside boxes is provided with an opening having a suitable closure, through which opening live or dead bait is inserted, as will be clearly seen in Fig. 1.

This invention comprises further objects and combinations of elements which will be hereinafter more fully described, shown in the accompanying drawings, and the novel features thereof will be pointed out by the appended claims.

The features, elements and the arrangement thereof, which constitute the above entitled invention, may be changed and varied, that is to say, in an actual reduction to practice, with the understanding that the changes and variations accruing from said reduction to practice are limited to the scope of the appended claims.

To obtain a full and correct understanding, of the details of construction, combinations of features, elements and advantages, reference is to be had to the hereinafter set forth description and the accompanying drawings in connection therewith, wherein—

Figure 3:
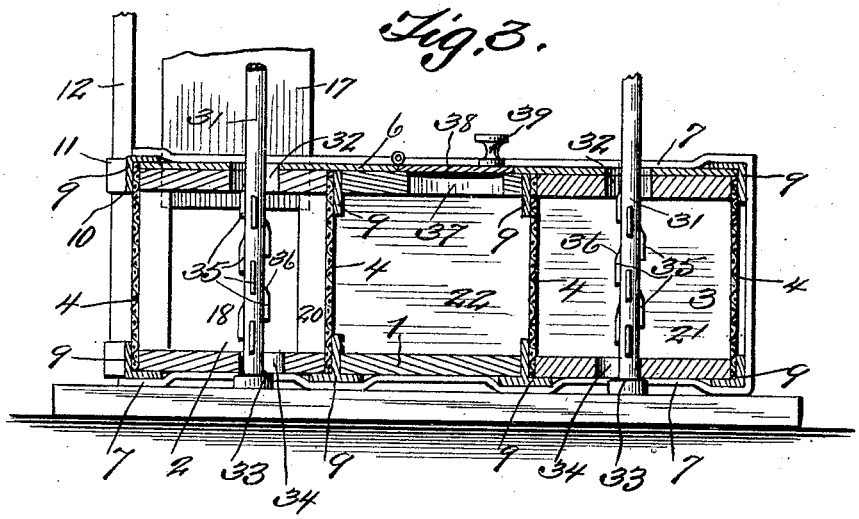
Figure 4:
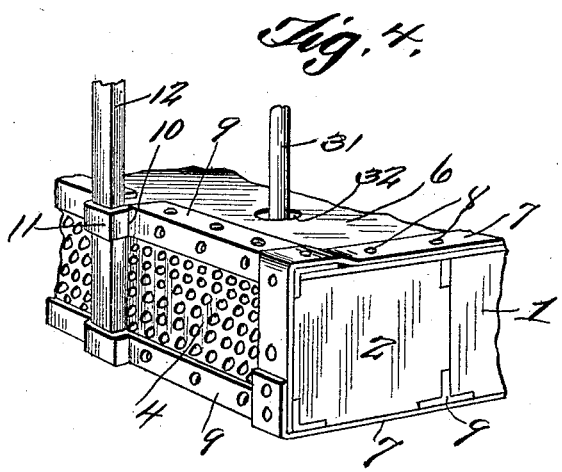

Fig. 1 is a perspective view of the trap embodying the improved features of the invention. Fig. 2 is a view in perspective showing the three boxes and their correlative parts disassembled. Fig. 3 is a sectional view on line 3—3 of Fig. 1, showing the construction of the trigger device and the catch therefor. Fig. 4 is a detail view of the outside boxes each having upon its one side an upright standard, which supports cooperative parts of the trap doors, which boxes have a modified form of perforated sides.

In regard to the drawings, wherein similar reference characters indicate corresponding parts in the several illustrations, by figures 1, 2 and 3 designate three boxes, the boxes 2 and 3 having mesh or perforated sides 4, that is, upon two of their longitudinal sides, and which boxes when secured in place upon opposite sides of the box 1 the mesh or perforated sides of the boxes 2 and 3 close the open sides 5 of the box 1, as clearly seen in Figs. 1 and 2 of the drawings. These three boxes are secured in place by means of a sheet metal covering 6, which is of a dimension equal to the three boxes, that is, in width and length, as seen in Fig. 1. This sheet metal covering 6 is bound in place by strips of sheet metal 7, which are secured to the entire corners of the boxes, by means of nails or other fastening devices 8, as clearly shown.

Strips of sheet metal 9 are also utilized for fastening the mesh or perforated sides in their proper places, and each strip 9 is provided, as at 10, with a loop 11, in which is positioned a standard 12, as seen clearly in Fig. 1. Each standard 12 upon its upper end is provided with a projection or stud 13, which extends through an aperture 14 of the cross beam 15, which beam supports the rigging coöperative parts 16 of the trap doors 17, as clearly shown in Fig. 1. Said trap doors or closures 17 are for the purpose of closing the openings 18 at opposite ends of the trap, through which openings the animal to be caught passes, that is, when attracted by the odor of the live or dead bait, which is positioned upon the interior of the center box 1.

It will be seen that the trap doors or closures 17 are guided in their movements by the gideways 19, reference being had to Fig. 1. When the three boxes are fastened together three compartments 20, 21 and 22 are formed, the compartment 22 being the one in which the live or dead bait is positioned, while the compartments 20 and 21 are entered by the attracted animal, for which the trap is set.

Secured to the cross beam 15 are the hooks or staples 23, which are utilized for the purpose of holding the oscillating beams 24, which compose part of the rigging or coöperative parts 16 of the trap doors. These oscillating beams have fastened at their ends 25 ropes or cables 26, which are in turn fastened to the trap doors, as at 27, while the ends 28 of the said oscillating beams 24 have connected thereto ropes or cables 29, which are in turn connected, as at 30, to the trigger devices 31, which operate through openings or apertures 32 in the upper portion or sheet metal covering of the trap, as clearly seen in Fig. 1. These trigger devices 31 are slightly shouldered at their lower ends, as at 33, and extend through apertures or openings 34, in the bottom of the boxes 2 and 3 of the trap. The said shoulders of the trigger devices are designed to engage the lower face of the bottom of the trap, that is, when the trap doors are open. The said trigger devices are provided on their circumference with studs, projections or roughened surfaces 35, which are beveled upwardly, as at 36, so as when the trigger devices are released they will easily and effectually pass through the openings 32 of the top or sheet metal covering of the trap, that is, when the attracted animal contacts therewith, thereby causing the release of the said trigger devices, which in turn would drop the trap doors, thereby catching or trapping the animal.

The central box 1 is provided with an opening 27, through which the live or dead bait is inserted, which opening is provided with a closure 38, for the purpose of closing the said compartment 22, which closure is provided with a knob 39 and locking devices 40.

From the foregoing, the essential features, elements and the operation of the device, together with the simplicity thereof, will be clearly apparent.

This trap may be made of any dimensions, suitable to the applicant, and is designed to be constructed, as shown, for the purpose of disassembling the parts thereof, so that the same may be packed for shipment, in other words, this trap is what is termed a knockdown animal trap.

Having thus fully described the invention, what is claimed as new and useful, and desired to be protected by Letters Patent, is:—

1. In an animal trap, three boxes placed together to form three compartments, the walls of which are provided with wire mesh, a sheet metal covering for securely holding them in position, metal binding for holding the metal covering in place, the two end boxes having openings, trap doors therefor, trigger mechanisms for the doors, said central box having an opening in its upper portion, and a closure for the opening of the central box.

2. In an animal trap, a casing comprising three boxes, a central box and two outside boxes, each outside box having mesh or perforated sides, said central box having two open sides adapted to be closed by the mesh or one side of each outside box, a sheet metal securing plate for holding the boxes in place, metal binding for the sheet metal securing plate, each outside box having openings, closures therefor and trigger mechanisms for the closures.

3. In an animal trap, a casing comprising three compartments the walls of which are provided with wire mesh, a central compartment and two outside compartments, said outside compartments having openings, closures therefor, trigger mechanisms for the closures comprising oscillating beams, trigger devices having shouldered ends and provided with projections being beveled upon their upper portions, the bottom of the casing having apertures through which the lower ends of the trigger devices pass, said shouldered ends adapted to engage the circumference of said apertures.

4. In an animal trap, a casing comprising three compartments, a central compartment and two outside compartments, mesh work for closing the compartments, said outside compartments having openings, closures therefor, said casing having projecting from two sides thereof standards, a cross beam connecting said standards, trigger mechanisms for the said closures comprising oscillatory beams, and trigger devices having shouldered ends and provided with projections having beveled portions upon their upper portions, said oscillatory beams being supported by said cross beam, the bottom of the casing having apertures through which the lower ends of the trigger devices pass, said shouldered ends adapted to engage the circumference of said apertures.

5. In an animal trap, a casing having three compartments the walls of which are provided with wire mesh, two of which have openings thereinto, closures therefor, trigger mechanisms having trigger devices having shouldered ends and provided with projections being beveled upon their upper portions, the bottom of the casing having apertures with the walls of which the shouldered ends engage, the shouldered ends of said trigger devices adapted to be released when contacted with by a moving object thereby allowing the closures to close.

6. In an animal trap, a casing comprising three boxes, a central box and two outside boxes, each outside box having mesh or perforated sides, said central box having two open sides adapted to be closed by the mesh of one side of each outside box, a sheet metal securing plate for holding the boxes in place, metal binding for the sheet metal securing plate, each outside box having openings, closures therefor, trigger mechanisms, a cross beam support therefor, said casing having loops, standards fixed therein adapted to support said cross beam support, said trigger mechanisms comprising oscillatory beams and trigger devices having shouldered ends and provided with projections being beveled upon their upper portions, the bottom of the casing having apertures with the walls of which the shouldered ends engage, the shouldered ends of said trigger devices being adapted to be released when contacted with by a moving object, thereby allowing the closures to close.

In testimony whereof I have signed my name to this specification in the presence of two subscribing witnesses.

PHESENTON SUGGS HICKS.

Witnesses:
J. W. PORTIS,
E. F. ARRINGTON.